(12) United States Patent
Cutler et al.

(10) Patent No.: US 7,630,728 B2
(45) Date of Patent: Dec. 8, 2009

(54) METHOD AND SYSTEM FOR SYNCHRONIZING A NETWORK OF RF DEVICES

(75) Inventors: Robert T. Cutler, Everett, WA (US); Glenn R. Engel, Snohomish, WA (US); John C. Eidson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 491 days.

(21) Appl. No.: 11/344,815

(22) Filed: Jan. 31, 2006

(65) Prior Publication Data

US 2007/0178921 A1    Aug. 2, 2007

(51) Int. Cl.
*H04B 7/00* (2006.01)

(52) U.S. Cl. .................. 455/502; 455/526.1; 455/556.1; 370/350

(58) Field of Classification Search ............. 455/526.1, 455/500, 501, 502, 550.1, 556.1; 370/328, 370/350
See application file for complete search history.

(56) References Cited

U.S. PATENT DOCUMENTS

| 6,317,596 | B1 * | 11/2001 | Elwin ........................ 455/423 |
| 7,310,364 | B2 * | 12/2007 | Linsky et al. ................ 375/141 |
| 2004/0167990 | A1 * | 8/2004 | Peer ........................... 709/248 |
| 2006/0030277 | A1 * | 2/2006 | Cyr et al. ...................... 455/77 |
| 2006/0056559 | A1 * | 3/2006 | Pleasant et al. ............. 375/356 |

* cited by examiner

*Primary Examiner*—Nhan T Le

(57) ABSTRACT

A network of RF devices is connected to a central processing device and a common network clock. The central processing device and the RF devices exchange timing information in order to synchronize the network of RF devices to a common time defined by the common network clock.

20 Claims, 4 Drawing Sheets

METHOD AND SYSTEM FOR SYNCHRONIZING A NETWORK OF RF DEVICES

BACKGROUND

Networks of RF devices are used in a variety of applications and systems. Synchronizing the operation, control, and measurement functions of each device to a common time can result in more effective and efficient device and network operations. For example, the devices are synchronized when the devices are to perform a task at the same time. Examples of such tasks include receiving or time-stamping RF data.

Time synchronization can also be important in signal detection and data acquisition. For example, the probability of a device intercepting and detecting a signal with low or negative signal to noise resolution increases when the RF devices are synchronized. As another example, time-difference-of-arrival signal processing techniques for geolocation require accurate time synchronization. Imaging devices such as long-baseline interferometers, and ranging devices (RADAR) also require receiver synchronization. This has historically been accomplished using atomic clocks or dedicated synchronization cables.

SUMMARY

In accordance with the invention, a method and system for synchronizing networks of RF devices are provided. A network of RF devices is connected to a central processing device and a common network clock. The RF devices are devices that receive or generate RF signals, such as, for example, RF receivers or RF emitters. The central processing device and the RF devices exchange timing information in order to synchronize the network of RF devices to a common time defined by the common network clock. The exchanged timing information may also be used as a frequency reference for the RF devices. The timing information may be exchanged using one or more wired or wireless network connections or using a combination of wired and wireless network connections.

DETAILED DESCRIPTION

The following description is presented to enable embodiments in accordance with the invention to be made and used, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 1:
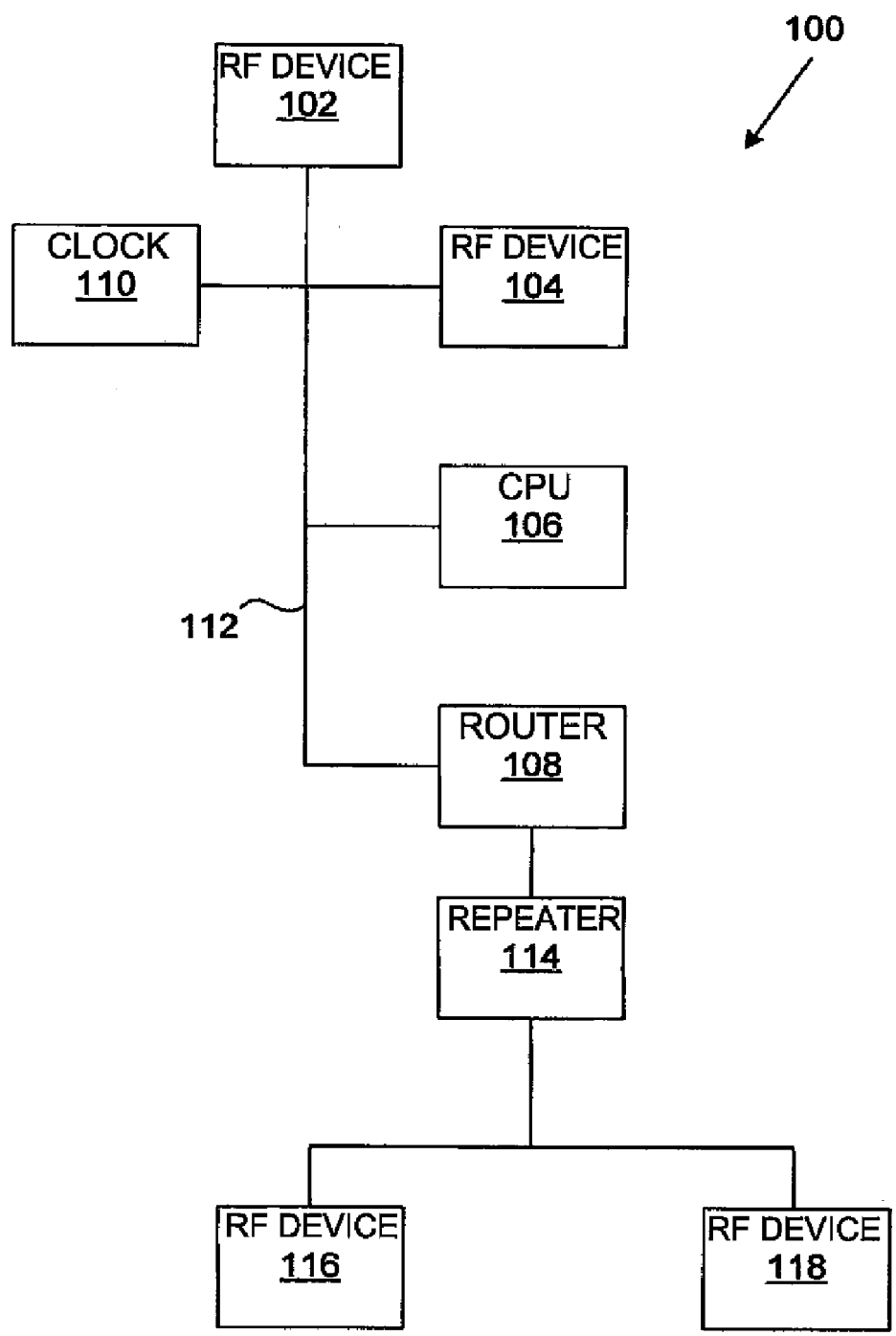
FIG. 1 is a diagrammatic illustration of a network of RF devices in an embodiment in accordance with the invention.

With reference to the figures and in particular with reference to FIG. 1, there is shown a diagrammatic illustration of a network of RF devices in an embodiment in accordance with the invention. Embodiments in accordance with the invention are not limited to the topology shown in FIG. 2. Networks of RF devices may be arranged in any topology in other embodiments in accordance with the invention.

Network 100 includes RF devices 102, 104, central processing device 106, and router 108 connected to common network clock 110 through network connection 112. Central processing device 106 controls RF devices 102, 104 and is implemented as a discrete processing device, such as a computer, in one embodiment in accordance with the invention. Network connection 112 is implemented as a wired connection in an embodiment in accordance with the invention. For example, network 100 is a wired local area network (LAN) in an embodiment in accordance with the invention. In other embodiments in accordance with the invention, network connection 112 is implemented as a wireless connection or with a combination of wired and wireless network connections.

Although RF devices 102, 104, central processing device 106, and router 108 are shown connected to common network clock 110 through a single network connection, other embodiments in accordance with the invention may connect devices 102, 104, central processing device 106, and router 108 to common network clock 110 using individual connections or through a combination of network connections.

Repeater 114 is connected to router 108 and RF devices 116, 118. RF devices 102, 104, 116, 118 are devices that receive or generate RF signals for purposes other than cellular applications. For example, the RF devices may be RADAR transmitters and receivers or RF sensors used to detect and geolocate RF emitters. RF devices 102, 104, 116, 118 are implemented as RF receivers in an embodiment in accordance with the invention.

In other embodiments in accordance with the invention, RF devices 102, 104, 116, 118 are RF signal generators or transmitters. For example, the RF transmitters may be used in the calibration or operation of a time-of-arrival geolocation system in an embodiment in accordance with the invention. Each RF device 102, 104, 114, 116 may be implemented as a discrete component or integrated within another device.

RF devices 102, 104, 114, 116 use network 100 for data transmission and processing in an embodiment in accordance with the invention. For example, RF device 102 may transmit or receive data from RF device 118 in network 100. RF devices 102, 104, 116, 118 also transmit data to central processing device 106 for data processing and analysis in an embodiment in accordance with the invention.

Central processing device 106 and RF devices 102, 104, 116, 118 exchange timing information that is used to synchronize RF devices 102, 104, 116, 118 to a common time defined by common network clock 110. Common network clock 110 is housed within central processing device 106 in an embodiment in accordance with the invention. In other embodiments in accordance with the invention, common network clock 110 is integrated within an RF device in network 100.

Network 100 uses the Institute of Electrical and Electronic Engineers (IEEE) 1588 Standard to synchronize RF devices 102, 104, 116, 118 in an embodiment in accordance with the invention. Other embodiments in accordance with the invention may implement different time synchronizing protocols. Moreover, the network devices that add delay, such as, for example, a switch, router, and repeater, may need symmetrical transmission and reception delays in other embodiments in accordance with the invention. In some of these embodiments, the delays may be compensated for in the RF system calibrations when the mean of the asymmetrical delays is stationary over a time interval.

Embodiments in accordance with the invention can achieve timing accuracy of at least 50 nanoseconds with a standard deviation of less than 30 nanoseconds. The required accuracy in synchronizing RF devices 102, 104, 116, 118 depends on the application. Each application can have a different tolerance level for error in determining distance. A number of factors affect accuracy in time difference of arrival (TDOA) and time of arrival (TOA) applications, including, but not limited to, the location of an RF device, the signal transmission speed (typically one foot per nanosecond in free space), noise, and the physical environment (e.g. structures, ground topology) near or surrounding the RF device.

Figure 2:
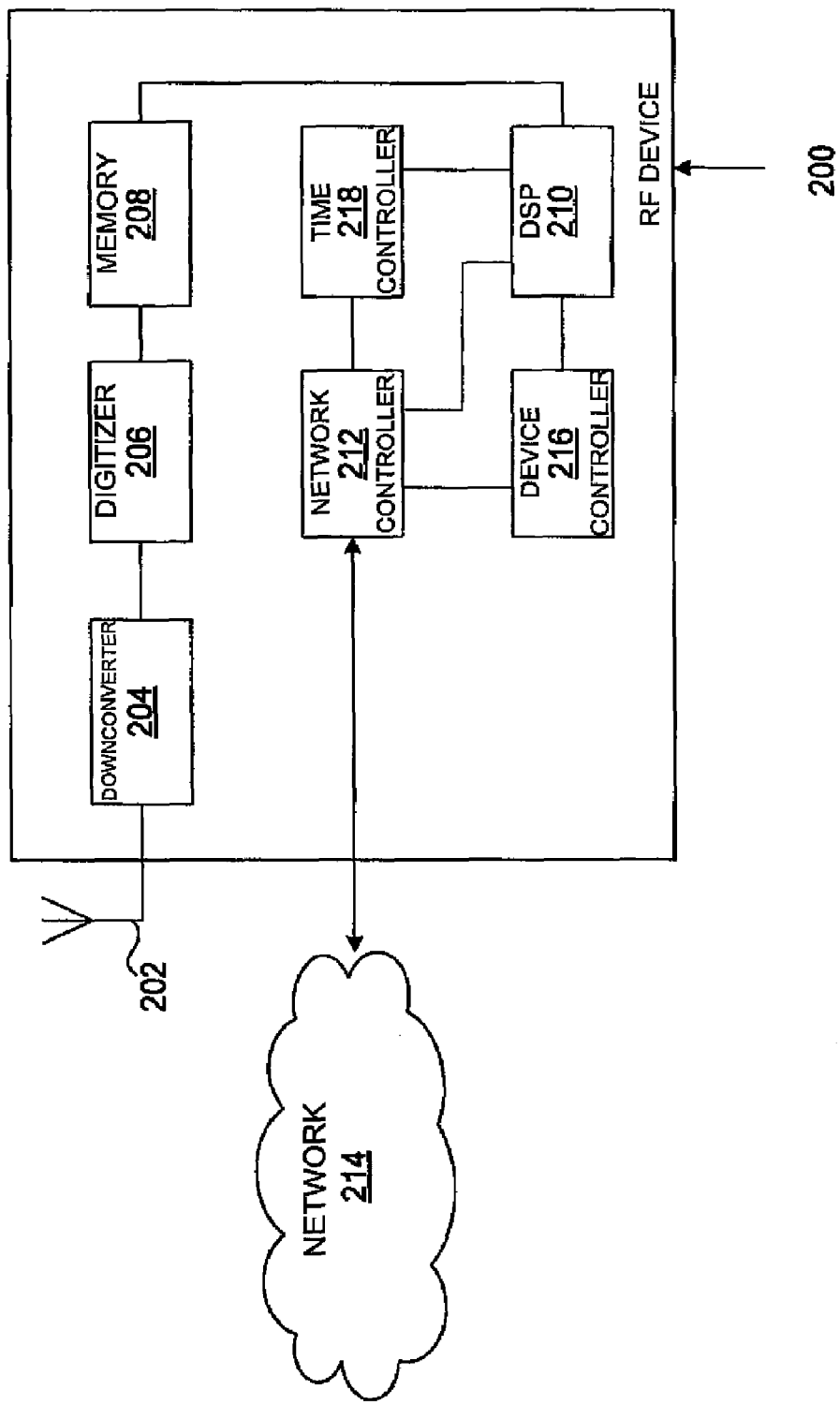
FIG. 2 is a block diagram of an RF device in an embodiment in accordance with the invention.

FIG. 2 is a block diagram of an RF device in an embodiment in accordance with the invention. RF device 200 includes antenna 202 that transmits or receives RF data or signals. Although only one antenna is shown in FIG. 2, RF device 200 may include multiple antennas in other embodiments in accordance with the invention.

RF device 200 is implemented as an RF receiver in an embodiment in accordance with the invention. Downconverter 204 receives RF data from antenna 202 and converts the RF data to a particular frequency spectrum. The converted RF data are then transmitted to digitizer 206, which converts the analog RF data to digital data. The digital data are then time-stamped and buffered in memory 208. Although only one receiver is shown in FIG. 2, RF device 200 can include multiple receiver channels in other embodiments in accordance with the invention.

Digital signal processor 210 reads the digital data from memory 208 and processes the digital data. Examples of data processing that may be performed by digital signal processor 210 include, but are not limited to, signal compression, demodulation, feature extraction, and data reduction. Network controller 212 transmits the data to another device in network 214. The other device may be another RF device or a central processing device (e.g., 106 in FIG. 1). Device controller 216 formats the data for transmission over a network, initiates or regulates data acquisition and transfer, and provides other controller functions.

Network controller 212 also receives timing information from network 214 that is used to synchronize receiver clock 217 in time controller 218 to a common time. The common time is defined by a common network clock (e.g., 110 in FIG. 1). In other embodiments in accordance with the invention, receiver clock 217 acts as a common network clock and network controller 212 transmits timing information to the other RF devices in network 216 to synchronize the RF devices to the common time as defined by receiver clock 217.

Time controller 218 distributes timing information to the other components in RF device 200. Time controller 218 achieves timing accuracy of at least 50 nanoseconds with a standard deviation of less than 30 nanoseconds in an embodiment in accordance with the invention. Time controller 218 provides accurate timing information to digitizer 206 and serves as a frequency reference for downconverter 204, which improves the tuning accuracy of receiver 200. Time controller 218 also improves short term timing stability by using high-quality oscillators in an embodiment in accordance with the invention. In another embodiment in accordance with the invention, time controller 218 serves as a temporary timing service when the network timing services are degraded or unavailable.

RF device 200 is implemented as an RF emitter in another embodiment in accordance with the invention. The direction of signal travel is reversed, in that antenna 202 transmits RF data. Digitizer 206 is replaced with a digital-to-analog converter that receives digital data from memory 208 and converts the digital data to analog data. Down converter 204 is replaced with an up converter, which converts the analog data to an RF signal. The RF signal is then transmitted over antenna 202.

Figure 3:
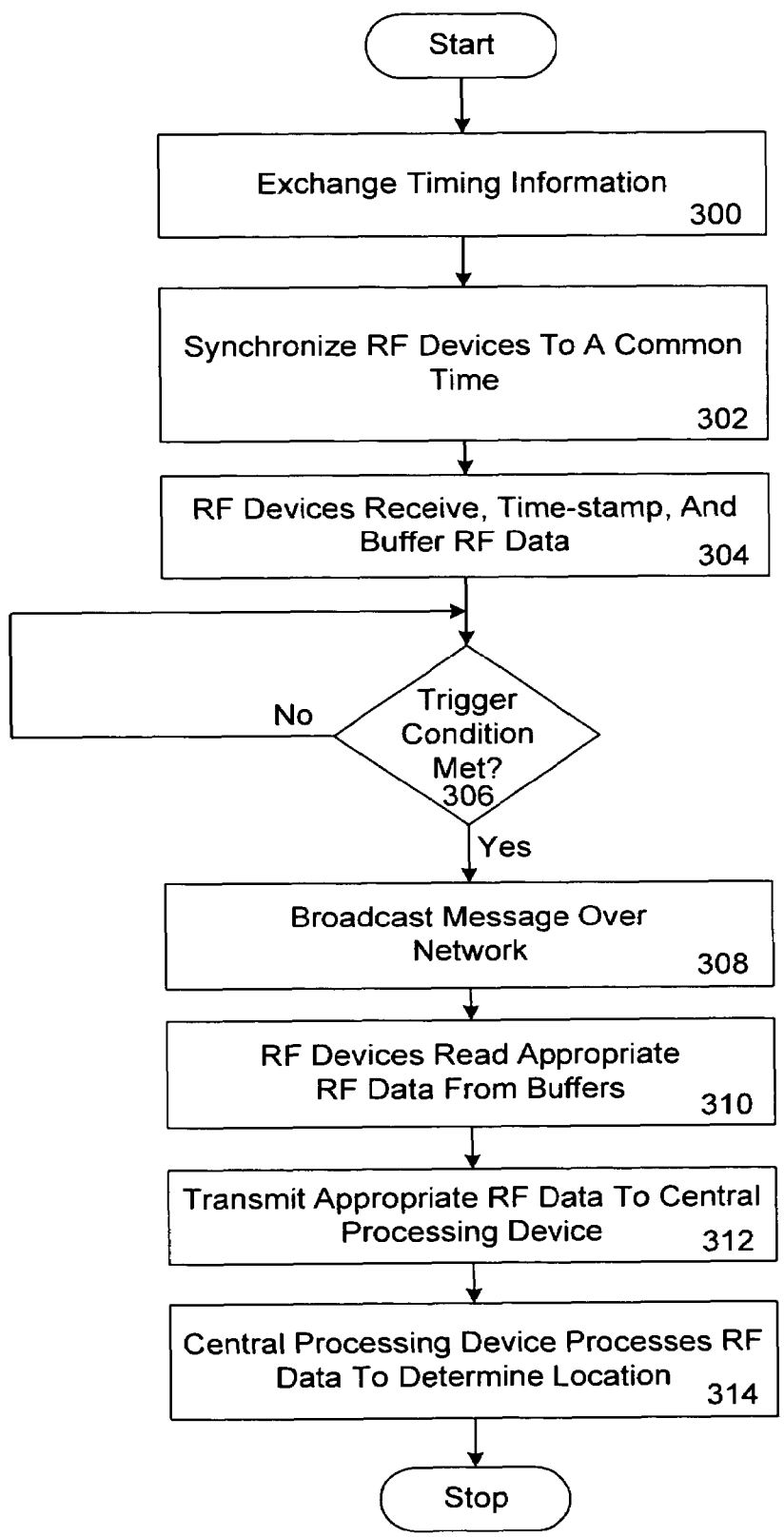
FIG. 3 is a flowchart of a first method for determining a location using synchronized RF devices in an embodiment in accordance with the invention.

Referring to FIG. 3, there is shown a flowchart of a method for determining a location using synchronized RF devices in an embodiment in accordance with the invention. The location of an RF emitter is to be determined using a network of RF receivers in the embodiment of FIG. 3. Initially, timing information is transmitted to and from the RF receivers and a central processing device in an embodiment in accordance with the invention. The timing information includes information about the time of a common network clock. The RF receivers synchronize their receiver clocks to the common time based on the exchanged timing information (block 302).

The RF receivers then receive, time-stamp, and buffer RF data at block 304. A determination is then made at block 306 as to whether a trigger condition has been met. Examples of a trigger condition include, but are not limited to, a pre-determined time of day, a signal characteristic such as amplitude, a change in a signal characteristic such as a frequency shift in a signal, and the receipt of a message from one or more receivers in the network. In other embodiments in accordance with the invention, the trigger message can be generated by other devices in the network.

When one or more receivers detect the trigger condition, the receivers broadcast a message over the computer network, as shown in block 308. The broadcast message includes information regarding the time of signal detection in an embodiment in accordance with the invention. In other embodiments in accordance with the invention, a peer-to-peer message is transmitted by the receiver that detects the trigger condition.

The receivers read the appropriate RF data from their buffers in response to the message (block 310). Because the receivers are synchronized to a common time and have time-stamped the RF data, the receivers are able to determine which data in their buffers is the appropriate RF data that corresponds to the time when the trigger condition was detected. The receivers then transmit the appropriate RF data to the central processing device, as shown in block 312. The central processing device processes the RF data at block 314 to determine a location of the RF emitter.

Determining the location of the emitter may be achieved, for example, through cross-correlation of the RF data received from some or all of the receivers in the network to determine time difference of arrival between receiver pairings. This technique is known as the time difference of arrival technique. Other signal processing techniques may be used in other embodiments in accordance with the invention. For example, in another embodiment in accordance with the invention, the time of arrival technique is used to determine location.

FIG. 3 illustrates only one method for determining the location of an RF emitter using synchronized RF receivers. Other embodiments in accordance with the invention may determine the location using different techniques. For example, block 308 may be omitted in other embodiments in accordance with the invention. As another example, a triggering circuit may be included in the architecture of the RF devices and the RF devices read RF data out of their buffers only when the triggering circuit determines a predetermined triggering criterion (or criteria) is met.

Figure 4:
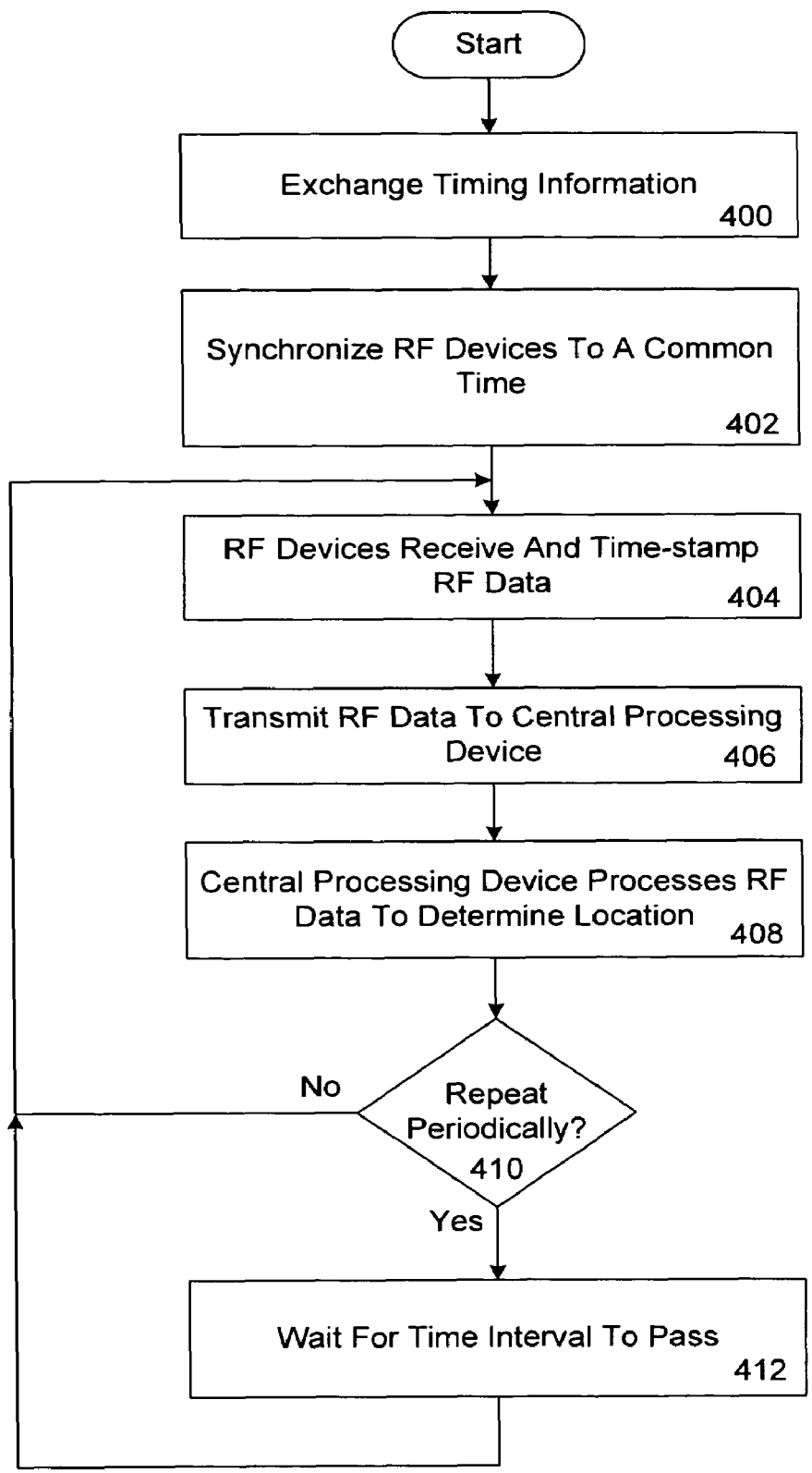
FIG. 4 is a flowchart of a second method for determining a location using synchronized RF devices in an embodiment in accordance with the invention.

FIG. 4 is a flowchart of a second method for determining a location using synchronized RF devices in an embodiment in accordance with the invention. The location of an RF emitter is to be determined using a network of RF receivers in the embodiment of FIG. 4. Initially, timing information is transmitted to and from the RF receivers and a central processing device in an embodiment in accordance with the invention. The timing information includes information about the time of a common network clock. The RF receivers synchronize their time controllers to the common time based on the exchanged timing information (block 402).

The RF receivers then receive and time-stamp RF data (block 404) and transmit the RF data to the central processing device (block 406). The central processing device processes the RF data at block 408 to determine a location of the RF emitter.

Determining the location of the emitter may be achieved, for example, through cross-correlation of the RF data received from some or all of the receivers in the network to determine time difference of arrival between receiver pairings. This technique is known as the time difference of arrival technique. Other signal processing techniques may be used in other embodiments in accordance with the invention. For example, in another embodiment in accordance with the invention, the time of arrival technique is used to determine location.

A determination is then made at block 410 as to whether the process is to repeat periodically. If not, the method returns to block 404 and repeats continuously. If the process is to repeat periodically, the method passes to block 412 to wait until a respective amount of time has passed. The process returns to block 404 once the respective amount of time has passed. The respective amount of time is implemented as a predetermined regular time interval in an embodiment in accordance with the invention. In other embodiments in accordance with the invention, the respective amount of time is implemented differently. For example, the respective amount of time may be implemented as a variable time interval or a time interval downloaded and programmed into the RF receiver.

The invention claimed is:

1. An RF device for use in a network of RF devices, comprising:
    a network controller connected to a network connection;
    a time controller operable to exchange timing information with the network controller and synchronize a receiver clock to a common time using the exchanged timing information; and
    an RF receiver, further comprising:
    a downconverter connected to an antenna;
    a digitizer connected to the downconverter;
    a memory connected to the digitizer;
    a digital signal processing device connected to the memory and the time controller; and
    a device controller connected to the digital signal processing device and the network controller.

2. The RF device of claim 1, wherein the exchanged timing information is used as a frequency reference for the RF receiver.

3. The RF device of claim 1, wherein the RF device further comprises an RF emitter.

4. The RF device of claim 3, further comprising:
    an upconverter connected to an antenna; and
    a digital-to-analog converter connected to the upconverter.

5. The RF device of claim 1, wherein the time controller is operable to synchronize the receiver clock to the common time with a timing accuracy of at least 50 nanoseconds and a standard deviation of less than 30 nanoseconds.

6. The RF device of claim 1, wherein the memory stores time-stamped RF data output by the digitizer in response to a wireless RF signal received by the RF device.

7. The RF device of claim 6, wherein the network controller transmits the time-stamped RF data via the network connection to a processor.

8. A network, comprising:
    a central processing device; and
    a plurality of RF devices each connected to the central processing device through one or more network connections, wherein each RF device includes:
        an antenna adapted to receive an RF signal;
        a downconverter adapted to downconvert the received RF signal to a particular frequency band;
        a memory adapted to store time-stamped RF data from the downconverted RF signal;
        a network controller configured to exchange timing information with the central processing device; and
        a time controller configured to synchronize a clock of the RF device to a common time using the exchanged timing information such that the time-stamped RF data is synchronized to the common time.

9. The network of claim 8, further comprising a common network clock.

10. The network of claim 8, wherein the common network clock is integrated within one RF device in the plurality of RF devices.

11. The network of claim 8, wherein the common network clock is integrated within the central processing device.

12. The network of claim 8, wherein the central processing device comprises a computing device.

13. The network of claim 8, wherein one or more RF devices in the plurality of RF devices comprise an RF receiver.

14. The network of claim 8, wherein one or more RF devices in the plurality of RF devices comprise an RF emitter.

15. The network of claim 8, wherein the time controller in at least one RF device provides a frequency reference for the downconverter in the at least one RF device.

16. The network of claim 8, wherein each RF device is adapted to transmit the time-stamped RF data to the central processing device.

17. The network of claim 16, wherein the central processing device is adapted to process the time-stamped RF data from the plurality of RF devices to determine a location of an RF emitter.

18. A method of determining the location of an RF emitter, comprising:
    providing a network of RF devices connected to a central processing device;
    synchronizing the RF devices to a common time, wherein the synchronizing comprises:
        exchanging timing information between the central processing device and each of the RF devices in the network of RF devices, and
        synchronizing a receiver clock in each RF device in the network of RF devices to a common time using the exchanged timing information;
    at each of the RF devices: (1) receiving an RF signal from the RF emitter, (2) processing the received RF signal to produce RF data, (3) time-stamping the RF data using the common time of the receiver clock, and (4) storing the time-stamped RF data;
    transmitting the time-stamped RF data to the central processing device; and
    at the central processing device, processing the time-stamped RF data from the plurality of RF devices to determine the location of the RF emitter.

19. The method of claim 18, further comprising using the exchanged timing information as a frequency reference for a downconverter in at least one of the RF devices in the network of RF devices.

20. The method of claim 18, wherein the time-stamped RF data is transmitted to the central processing device in response to the RF device detecting a trigger condition.

* * * * *